(12) United States Patent
Timsjo et al.

(10) Patent No.: US 9,471,051 B2
(45) Date of Patent: Oct. 18, 2016

(54) AUTOMATIC GENERATION OF VISUAL REPRESENTATION OF USER INTERFACE OF PROCESS CONTROL SYSTEM

(71) Applicant: ABB Research Ltd., Zurich (CH)

(72) Inventors: Susanne Timsjo, Vasteras (SE); Martin Olausson, Vasteras (SE)

(73) Assignee: ABB Research Ltd., Zurich (CH)

( * ) Notice: Subject to any disclaimer, the term of this patent is extended or adjusted under 35 U.S.C. 154(b) by 428 days.

(21) Appl. No.: 14/065,934

(22) Filed: Oct. 29, 2013

(65) Prior Publication Data
US 2014/0058542 A1 Feb. 27, 2014

Related U.S. Application Data

(63) Continuation of application No. PCT/EP2011/056870, filed on Apr. 29, 2011.

(51) Int. Cl.
*G06F 19/00* (2011.01)
*G05B 15/02* (2006.01)
*G05B 19/042* (2006.01)

(52) U.S. Cl.
CPC .......... *G05B 15/02* (2013.01); *G05B 19/0426* (2013.01); *G05B 2219/31467* (2013.01); *G05B 2219/31469* (2013.01)

(58) Field of Classification Search
USPC ...................................... 700/17, 83; 715/771
See application file for complete search history.

(56) References Cited

U.S. PATENT DOCUMENTS

| | | | |
|---|---|---|---|
| 5,923,307 A * | 7/1999 | Hogle, IV | G06F 3/04897 345/1.3 |
| 7,751,265 B2 * | 7/2010 | So | G11C 29/1201 365/189.02 |
| 2003/0048275 A1 * | 3/2003 | Ciolac | G09G 5/14 345/544 |
| 2004/0061701 A1 | 4/2004 | Arquie et al. | |
| 2005/0071124 A1 | 3/2005 | Komatsu | |
| 2007/0132779 A1 * | 6/2007 | Gilbert | G05B 19/0426 345/619 |
| 2007/0150810 A1 * | 6/2007 | Katz | G06F 3/0481 715/229 |
| 2007/0239291 A1 | 10/2007 | Wayland et al. | |
| 2008/0250312 A1 * | 10/2008 | Curtis | G06Q 10/00 715/700 |
| 2010/0017746 A1 | 1/2010 | Husoy et al. | |

(Continued)

FOREIGN PATENT DOCUMENTS

| | | |
|---|---|---|
| JP | 2006059236 A | 3/2006 |
| WO | 2005109122 A1 | 11/2005 |

OTHER PUBLICATIONS

International Preliminary Report on Patentability Application No. PCT/EP2011/056870 completed: Apr. 25, 2013 18 pages.

(Continued)

*Primary Examiner* — Kidest Bahta
(74) *Attorney, Agent, or Firm* — Whitmyer IP Group LLC

(57) ABSTRACT

A method for displaying visual representation of at least one user interface, UI, of a process control system, the at least one UI being displayed on an electronic visual display unit connectable to the process control system and being adapted to visually indicate relationship between a plurality of components included in at least a part of a process controlled by the process control system, is disclosed. Data associated with different components in the process controlled by the process control system indicative of the operational status of the respective component is used to visualize the operational status of the components in each UI on the electronic visual display unit.

21 Claims, 6 Drawing Sheets

(56) References Cited

U.S. PATENT DOCUMENTS

2010/0050130 A1* 2/2010 Farn .................. G06F 8/38 715/853
2010/0281386 A1* 11/2010 Lyons .................. G06F 3/048 715/731

OTHER PUBLICATIONS

International Search Report & Written Opinion of the International Searching Authority Application No. PCT/EP2011/056870 Completed: Dec. 22, 2011; Mailing Date: Dec. 29, 2011 14 pages.

* cited by examiner

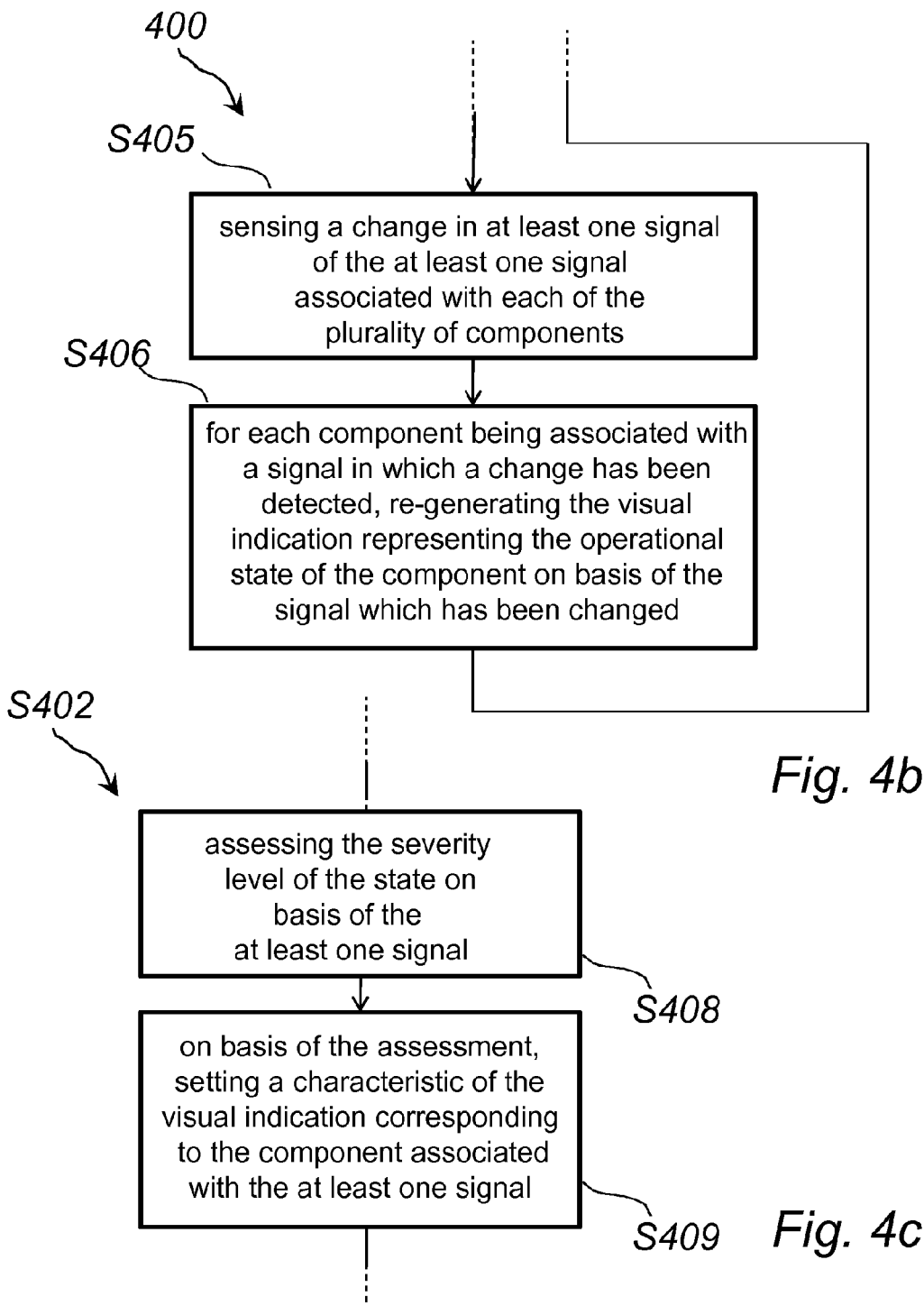

AUTOMATIC GENERATION OF VISUAL REPRESENTATION OF USER INTERFACE OF PROCESS CONTROL SYSTEM

FIELD OF THE INVENTION

The present invention generally relates to process control systems. Specifically, the present invention relates to a method for generation of a visual representation of at least one user interface (UI) of a process control system.

BACKGROUND OF THE INVENTION

In control systems for controlling and/or monitoring an industrial process, the operator typically controls/monitors the entire process or different parts of the process by means of one or more user interfaces (UIs), for example constituted by one or more graphic windows displayed on a display screen, each graphic window displaying process graphics. Such UIs may enable the operator to monitor the status of the different components of the process and/or control the operation of individual components of the process by means of user input provided to the UI. Providing user input to the UI may for example comprise providing instructions to a component of the process by means of a pointing device, such as a computer mouse, for manipulating objects in the UI. For example, appropriate parts in a graphic window displayed on a display screen may be selected and manipulated by means of "clicking" them using the computer mouse.

A UI such as described above may be adapted to visually indicate to the user or operator the positions of the components included in the process relatively to each other. Thus, the UI may provide a display of a schematic arrangement of the components for providing the user with an overview of the process or a part of the process.

In some applications the number of parts or components in the process may be so large that all parts of the process cannot feasibly be shown to the user via a single UI at a time, for example in a single graphic window displayed on a display screen displaying process graphics. Hence, several UIs may be required in order to enable controlling and/or monitoring the entire process, but all of these UIs may not feasibly fit within the display screen at the same time. Therefore, in such a case the operator typically alternates between different UIs depending on which part of the process the operator wants to interact with or check status of.

For facilitating navigation between a relatively large number of different UIs comprising graphic windows displayed on a display screen, and also for providing the user with an overview of the entire process, thumbnails of the different graphic windows can be used, i.e. reduced size versions of the graphic windows or parts of them. Such thumbnails are typically displayed on the display screen. By selecting one of the thumbnails on the display screen, the user may bring up or put focus on the graphic window corresponding to the selected thumbnail, and then control and/or monitor the parts of the process indicated on the graphic window that has been brought up or put focus on. For selecting the correct graphic window to be brought up or to put focus on, the user generally needs to recognize the schematic arrangement of the components in the thumbnail, since the user is in general familiar with the general appearance of the UIs on the display screen. However, reducing the size of a UI comprising a graphic window on the display screen may result in a thumbnail comprising a relatively small graphic object that is cluttered with graphics objects. This may make it difficult for the user to recognize any distinctive pattern in the thumbnail for recognizing which part or parts of the process that are indicated in the UI that corresponds to the thumbnail. This may particularly be the case when the number of different parts or components indicated in the graphic window of the UI is relatively large.

WO2005109122 disclose graphic elements for use as portions or components of one or more graphic displays, which may be executed in a process plant to display information to users about the process plant environment, such as the current state of devices within the process plant. Each of the graphic elements is an executable object that includes a property or a variable that may be bound to an associated process entity, like a field device, and that includes multiple visualizations, each of which may be used to graphically depict the associated process entity on a user interface when the graphic element is executed as part of the graphic display. Any of the graphic element visualizations may be used in any particular graphic display and the same graphic display may use different ones of the visualizations at different times. The different visualizations associated with a graphic element make the graphic element more versatile, at they allow the same graphic element to be used in different displays using different graphical styles or norms. These visualizations also enable the same graphic element to be used in displays designed for different types of display devices, such as display devices having large display screens, standard computer screens and very small display screens, such as PDA and telephone display screens.

SUMMARY OF THE INVENTION

In view of the above discussion, a concern of the present invention is to improve displaying of user interface (UI) of a process control system for controlling a process including a plurality of components.

Another concern of the present invention is to facilitate navigation between UIs in such a process control system.

To address one or more of these concerns and other concerns, a method and a processing module in accordance with the present teachings are provided. Preferred embodiments are defined by the dependent claims.

According to a first aspect of the present invention, there is provided a method for displaying visual representation of at least one UI of a process control system, the at least one UI being displayed on an electronic visual display unit connectable to the process control system and being adapted to visually indicate relationship between a plurality of components included in at least a part of a process controlled by the process control system. Each component of the plurality of components is associated with at least one signal indicating an operational state of the component.

For each of the plurality of components, the at least one signal associated with the respective component is retrieved, and a visual indication representing the operational state of the component is generated on basis of the at least one signal associated with the respective component, wherein at least one characteristic of the visual indication depends on the at least one signal associated with the respective component.

The visual representation of the at least one UI is generated on basis of the visual indications.

The visual representation of the at least one UI is displayed on the display unit such that the relationship between the visual indications in the visual representation of the at least one UI as displayed on the display unit corresponds to the relationship between the plurality of components included in the at least a part of the process visually indicated by the at least one UI as displayed on the display unit.

The gist of the present invention is that instead of utilizing thumbnails of the different UIs for facilitating navigation between different UIs in a process control system, data associated with different components in a process controlled by the process control system indicative of the operational status of the respective component is used to visualize the operational status of the components in each UI on an electronic visual display unit or display screen.

To this end, the visualization or visual representation of the UI can be performed in such a manner that visual markers or indications of the components in the UI replaces or supplements the process graphics of the actual components in the UI, in such a way that the relative arrangement of the visual markers or indications in the visualization as displayed on the display screen corresponds to the relative arrangement of the components in the UI as displayed on the display screen. In this way, the user or operator may by visually inspecting the visualization as displayed on the display screen readily recognize which UI the visualization corresponds to. In turn, this may facilitate navigation between different UIs in the process control system.

The visualization is performed in such a manner that the visual markers or indications of the components in the UI can provide the user or operator with the operational status of the components in the UI by visually inspecting the visualization as displayed on the display screen. In this way, the user may detect which part or parts of the process that require attention and relatively easily and quickly navigate to the UI of that part or those parts of the process, by selecting the corresponding visualization or visual representation.

The visualization of operational status of the components in each UI allows for displaying the visualizations on the display screen in a smaller size compared to the respective UI, similarly to thumbnails as described in the foregoing, while still enabling the user to readily detect the operational status of the corresponding components by visual inspection of the visualization on the display screen and navigating between different UIs, since the visualization is not cluttered with graphics objects in the way a thumbnail of the UI might be. Since a thumbnail is merely a reduced size version of the process graphics or UI, a thumbnail does not allow a user to detect operational status of the process merely by visual inspection of the thumbnail on the display screen.

The above considerations particularly apply when the number of different UIs in the process control system is relatively large, such that all of the different UIs in the process control system cannot feasibly be made to fit within the display screen at the same time and/or when the number of different components in the UIs is relatively large. In such a case the user may neither be able to inspect nor provide user input to the UIs not currently visible on the display screen. Since some of the UIs may be not visible on the display screen while other UIs are visible on the display screen at a given moment, it may be difficult for the user to obtain an overview of the entire process or parts of the process.

The UI may be further adapted to enable the user to control the operational state of the respective components by means of user input provided to the UI.

According to a second aspect of the present invention, there is provided a processing device. The processing device is connectable to a process control system comprising at least one UI adapted to visually indicate relationship between a plurality of components included in at least a part of a process controlled by the process control system. Each component of the plurality of components is associated with at least one signal indicating an operational state of the component.

The processing device comprises an electronic visual display unit configured to display the at least one UI, and a processing module.

The processing module is adapted to, for each of the plurality of components, retrieve the at least one signal associated with the respective component, and generate a visual indication representing the operational state of the component on basis of the at least one signal associated with the respective component, wherein at least one characteristic of the visual indication depends on the at least one signal associated with the respective component.

The processing module is adapted to generate a visual representation of the at least one UI on basis of the visual indications.

The processing module is adapted to display the visual representation of the at least one UI on the display unit such that the relationship between the visual indications in the visual representation of the at least one UI as displayed on the display unit corresponds to the relationship between the plurality of components included in the at least a part of the process visually indicated by the at least one UI as displayed on the display unit.

According to a third aspect of the present invention, there is provided a process control system including a processing device according to the present invention.

According to a fourth aspect of the present invention, there is provided a computer program product adapted to, when executed in a processor unit, perform a method according to the present invention.

According to a fifth aspect of the present invention, there is provided a computer-readable storage medium on which there is stored a computer program product adapted to, when executed in a processor unit, perform a method according to the present invention.

According to a sixth aspect of the present invention, there is provided a use of a processing device according to the present invention in a process control system for controlling and/or monitoring of a process in an industrial installation and/or in an installation for production, transmission and/or distribution of energy.

In the context of the present application a component of a process may refer to a specific device that is included in the overall process installation. A component of the process may additionally or optionally refer to a specific step or steps that are part of the process.

In the context of the present application, the term "signal" encompasses electric signal and/or wireless radiowave signal, or any other suitable signal capable of conveying an indication of operational state of a component of a process controlled by the process control system.

A signal associated with a component of a plurality of components of a process controlled by the process control system may comprise data measured at the respective component indicative of an operational state thereof.

The process control system may be configured to control and/or monitor a process in an industrial installation and/or in an installation for production, transmission and/or distribution of energy.

The process control system may comprise a plurality of UIs. A visual representation of each of the plurality of UIs may be generated. The visual representation corresponding to each of the plurality of UIs is configured to enable a user to select the respective UI by means of user input provided to the visual representation for enabling control and/or monitoring of the operational state of the components visually indicated by said UI by means of user input to provide to the UI.

The at least one characteristic may for example comprise size, shape, pattern, brightness and/or color of the respective visual indication in the visual representation.

The at least one signal may indicate an emergency, alarm and/or warning state of the respective component. The severity level of the emergency, alarm and/or warning state may be assessed on basis of the at least one signal indicating an emergency, alarm and/or warning state. On basis of the assessment, a characteristic of the visual indication corresponding to the component being associated with the at least one signal indicating an emergency, alarm and/or warning state may be set. Hence, a characteristic of the visual indication corresponding to the component being associated with the at least one signal indicating an emergency, alarm and/or warning state may be set based on how critical the emergency, alarm and/or warning is.

Setting the characteristic of the visual indication corresponding to the component associated with the at least one signal indicating an emergency, alarm and/or warning state may comprise setting the size of the visual indication on basis of the assessed severity level.

The assessment of the severity level of the emergency, alarm and/or warning state may comprise comparing the indicated emergency, alarm and/or warning state with a predefined mapping between a plurality of emergency, alarm and/or warning states and corresponding severity levels.

The predefined mapping may for example comprise a look-up table.

Setting a characteristic of the visual indication corresponding to the component associated with the at least one signal indicating an emergency, alarm and/or warning state may comprise setting the characteristic such that the visual indication visually contrasts from a visual indication of a component associated with a signal indicating an operational state being within one of a predefined set of nominal operating states. Such a configuration may facilitate for the user to differentiate between emergency, alarm and/or warning states and "normal" states by visual inspection of the visual representation.

Alternatively or optionally, setting a characteristic of the visual indication corresponding to the component associated with the at least one signal indicating an emergency, alarm and/or warning state comprises setting the characteristic in accordance with Abnormal Situation Management (ASM) guidelines.

Alternatively or optionally, setting a characteristic of the visual indication corresponding to the component being associated with the at least one signal indicating an emergency, alarm and/or warning state may comprise:

setting the color of the visual indication to a first color on a condition that the at least one signal of the corresponding component indicates an emergency state;

setting the color of the visual indication to a second color on a condition that the at least one signal of the corresponding component indicates an alarm state;

setting the color of the visual indication to a third color on a condition that the at least one signal of the corresponding component indicates a warning state.

The first color, the second color and the third color are different from a color of a visual indication associated with a signal indicating an operational state within one of a predefined set of nominal operating states. Such a configuration may facilitate for the user to differentiate between emergency, alarm and/or warning states and "normal" states by visual inspection of the visual representation.

The characteristic of the visual indication corresponding to the component being associated with the at least one signal indicating an emergency, alarm and/or warning state in the visual representation may be varied according to a predetermined temporal function. Such a configuration may facilitate detection of emergency, alarm and/or warning status of the process components by the user visually inspecting the visual representation.

Further objects and advantages of the present invention are described in the following by means of exemplifying embodiments.

It is noted that the present invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Exemplifying embodiments of the invention will be described below with reference to the accompanying drawings, in which:

FIGS. 4a-4c are flowcharts of method steps in accordance with exemplifying embodiments of the present invention.

In the accompanying drawings, the same reference numerals denote the same or similar elements throughout the views.

DETAILED DESCRIPTION OF THE INVENTION

The present invention will now be described more fully hereinafter with reference to the accompanying drawings, in which exemplifying embodiments of the present invention are shown. This present invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to like or similar elements or components throughout. The steps of any method disclosed herein do not have to be performed in the exact order disclosed, unless explicitly stated.

Figure 1:
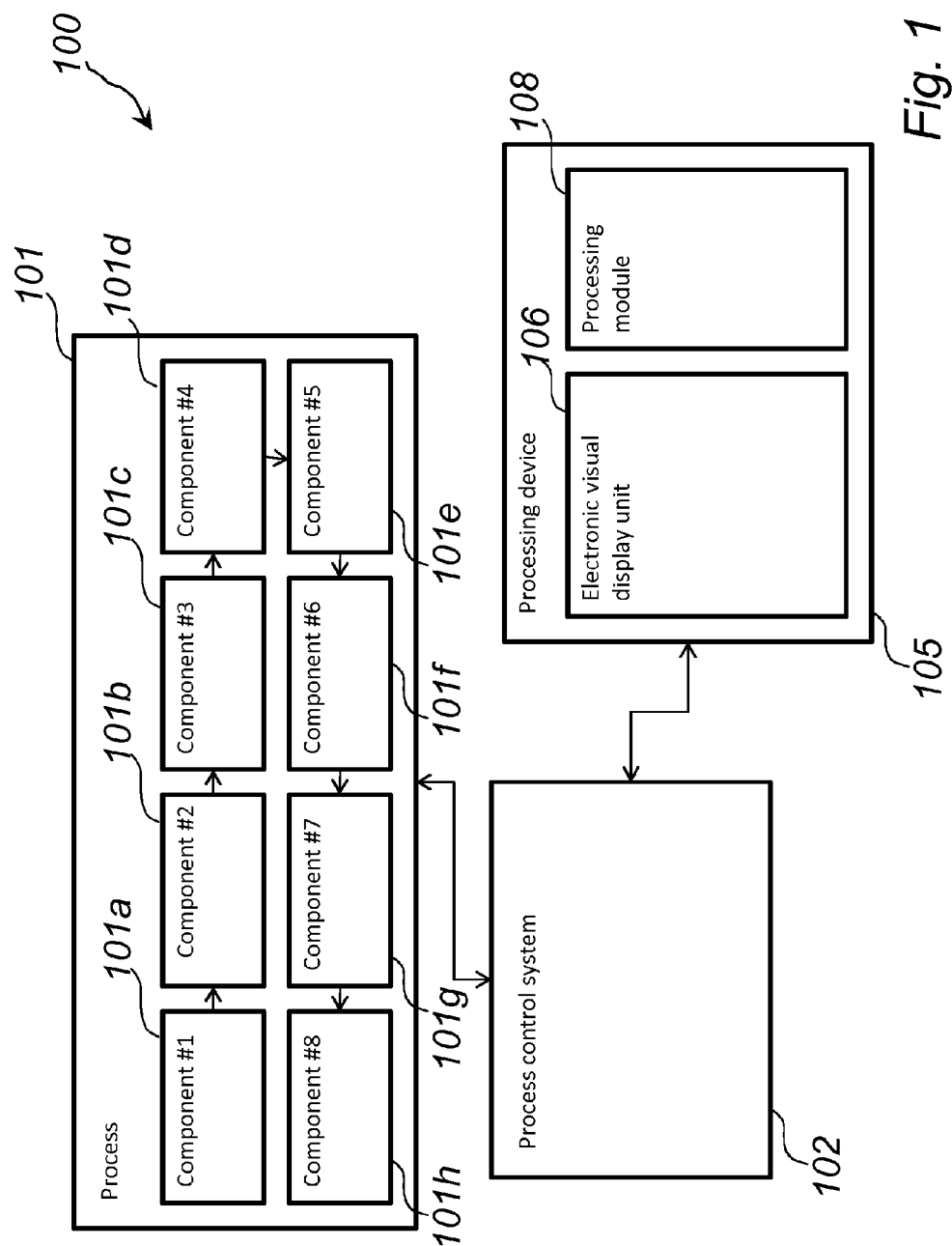
FIG. 1 is a schematic block diagram of a system in accordance with an exemplifying embodiment of the present invention.

Referring now to FIG. 1, there is shown a schematic block diagram of a system 100 in accordance with an exemplifying embodiment of the present invention.

The system 100 comprises a process 101 comprising several components, sub-processes, or steps 101a-101f.

Each component 101a-101f may refer to a specific device that is included in the overall installation embodying the process 101. A component 101a-101f of the process 101 may refer to a specific step or several steps that are part of the process 101.

In FIG. 1 it is indicated that the process components 101a-101f are processed or executed in a serial manner one after the other. However, this is merely according to one example; the process 101 can comprise other configurations. For example, the process 101 may be embodied in a machine with the components of the process being parts of the machine operating in concert or independently of each other. According to another example, the process 101 is a process taking place in an industrial installation and/or in an installation for production, transmission and/or distribution of energy.

In FIG. 1 there is shown eight components of the process 101. The number of components of the process 101 depicted in FIG. 1 is according to an example. It is to be understood that the process 101 may comprise any number of components being a positive integer, such as one, two, three, four, five, ten, fifteen, twenty, or a hundred or more components.

The process 101 is controlled by a process control system 102. To this end, the process control system 102 may be adapted to transmit control signals to and retrieve control signals from the process 101 or from each of the components 101a-101f for monitoring the operational status of and/or controlling the operation of the process 101 or each of the components 101a-101f.

Each component 101a-101f is associated with at least one signal indicating an operational state of the respective component 101a-101f. The at least one signal may for example be generated by the process control system 102 or by the respective component 101a-101f itself, and communicated to the process control system 102. The at least one signal associated with the respective component 101a-101f may for example comprise data measured at the respective component 101a-101f indicative of an operational state thereof.

The process control system 102 comprises at least one user interface (UI) adapted to visually indicate relationship between the components 101a-101f included in the process 101 controlled by the process control system 102. The UI may be adapted to enable the user, or operator of the process 101, to control the operational state of the respective components 101a-101f by means of user input provided to the UI.

The system 101 comprises a processing device 105. The processing device 105 is connectable to the process control system 102.

The processing device 105 comprises an electronic visual display unit 106 configured to display the at least one UI of the process control system 102.

The processing device 105 comprises a processing module 108.

The processing module 108 is adapted to, for each of the components 101a-101f, retrieve or access the at least one signal associated with the respective component 101a-101f. For example, the processing module 108 may be adapted to access or retrieve the at least one signal associated with the respective component 101a-101f from the process control system 102 or from the respective component 101a-101f itself.

The processing module 108 is adapted to, for each of the components 101a-101f, generate a visual indication representing the operational state of the respective component 101a-101f on basis of the at least one signal associated with the respective component 101a-101f.

At least one characteristic of the visual indication depends on the at least one signal associated with the respective component 101a-101f. This is described further in the following.

Thus, at least one characteristic of the visual indication of the respective component 101a-101f may depend on the operational state of the component.

The processing module 108 is adapted to generate a visual representation of the at least one UI of the process control system 102 on basis of the generated visual indications.

The processing module 108 is adapted to display the visual representation of the at least one UI of the process control system 102 on the electronic visual display unit 106, in such a way that the relationship between the visual indications in the visual representation of the at least one UI as displayed on the display unit corresponds to the relationship between the components 101a-101f included in the process 101 visually indicated by the at least one UI as displayed on the electronic visual display unit 106.

The at least one UI of the process control system 102 may be adapted to visually indicate positional and/or operational relationship between the components 101a-101f included in the process 101. Thus, the positional and/or operational relationship between the visual indications in the visual representation of the at least one UI as displayed on the electronic visual display unit 106 may correspond to the positional and/or operational relationship between the components 101a-101f included in the process 101 visually indicated in the at least one UI as displayed on the electronic visual display unit 106.

Figure 2:
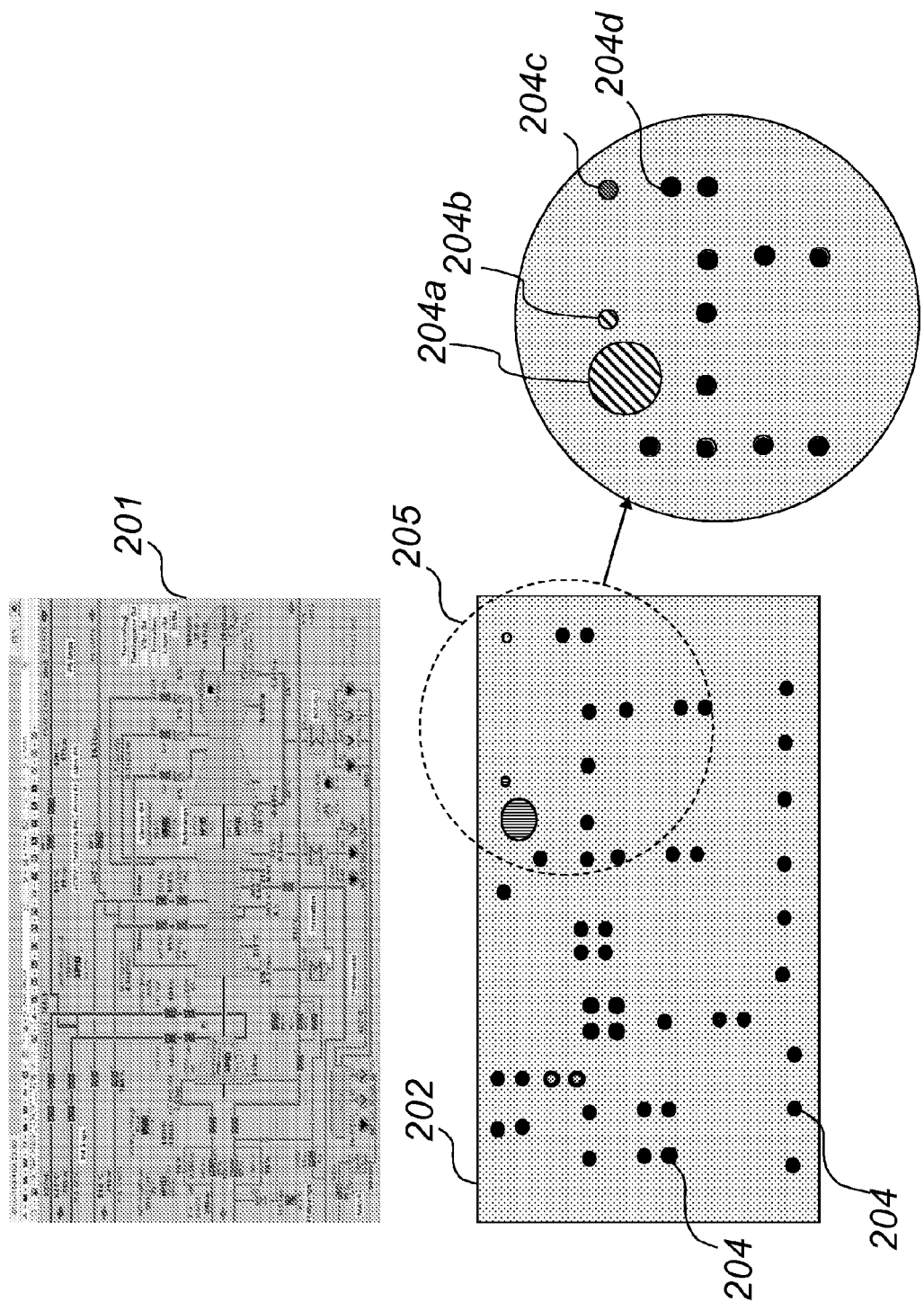
FIG. 2 is a schematic view illustrating principles of the present invention.

Referring now to FIG. 2, there is shown an example of a UI 201 comprising a graphics window displayed on an electronic visual display unit or display screen (not shown in FIG. 2), the graphic window displaying process graphics of several components of an industrial process. The UI 201 may enable a user or operator to monitor the status of the different components of the process and/or control the operation of individual components by means of user input provided to the UI 201. Providing user input to the UI 201 may for example comprise providing instructions to a component of the process indicated on the UI 201 by means of a pointing device, such as a computer mouse, for manipulating graphics objects in the UI 201. For example, appropriate parts in the graphic window 201 displayed on the display screen may be selected and manipulated by clicking them using the computer mouse.

As can be seen in FIG. 2, production of a thumbnail of the graphic window 201, e.g. a reduced size version of the graphic window 201, where the size reduction typically may be about 60-80% of each side of the graphic window, would result in a relatively small graphic object cluttered with graphics objects, since the number of process components indicated in the graphic window 201 is relatively large. This may make it difficult for the user to recognize any distinctive pattern or arrangement in the thumbnail as displayed on the display screen in order to recognize which part or parts of the process that are indicated in the UI 201 that corresponds to the thumbnail, i.e. to match the thumbnail with the UI 201.

With further reference to FIG. 2, there is shown a visual representation 202 of the UI 201 according to an exemplifying embodiment of the present invention displayed on an electronic visual display unit or display screen (not shown in FIG. 2).

The visual representation 202 comprises a plurality of visual indications 204, 204a, 204b, 204c, 204d representing operational state of a corresponding process component in the graphic window 201, each of which plurality of visual indications 204, 204a, 204b, 204c, 204d has been generated on basis of at least one signal associated with the corresponding process component, such as described above with reference to FIG. 1. Only some of the visual indications depicted in FIG. 2 are indicated by reference numerals.

The visual representation 202 of the UI 201 has been generated such that the relationship between the plurality of visual indications 204, 204a, 204b, 204c, 204d as displayed on the display screen corresponds to the relationship between the components included in the process visually indicated by the UI 201 as displayed on the display screen. In other words, the visual representation 202 of the UI 201 has been generated such that the arrangement of the visual indications 204, 204a, 204b, 204c, 204d relatively to each other as displayed on the display screen corresponds to the arrangement of the components indicated in the UI 201 as displayed on the display screen. By "corresponds" in this context it is meant that the "pattern" or "outline" of the visual indications 204, 204a, 204b, 204c, 204d as displayed on the display screen is similar to the pattern or outline of the components in the UI 201 as displayed on the display screen, in such a way that by visual inspection of the visual representation 202 on the display screen the user may recognize that the visual representation corresponds to the UI 201, i.e. match the visual representation 202 with the UI 201.

In FIG. 2 the UI 201 and the visual representation 202 of the UI 201 are of roughly the same size. This is for illustrative purposes. In general, the visual representation 202 would be displayed on the display screen in a considerably smaller size than the size of the UI 201 when displayed on the display screen.

As described above with reference to FIG. 1, at least one characteristic of each visual indication 204, 204a, 204b, 204c, 204d depends on the at least one signal associated with the respective process component. Hence, at least one characteristic of each visual indication 204, 204a, 204b, 204c, 204d can depend on the operational state of the respective process component.

In FIG. 2 the visual indications 204, 204a, 204b, 204c, 204d are depicted as filled circles of varying size and having different fill colors or patterns. However, other shapes are contemplated such as square, star, triangular, pentagonal, etc. Different visual indications may have different shapes. In general, the at least one characteristic of each visual indication may comprise size, shape, pattern, brightness and/or color of the visual indication.

The least one signal associated with each process component may indicate an emergency, alarm and/or warning state of the respective process component. On basis of the at least one signal indicating an emergency, alarm and/or warning state, the severity level of the emergency, alarm and/or warning state may be assessed.

On basis of the assessment, a characteristic of the visual indication corresponding to the component associated with the at least one signal indicating an emergency, alarm and/or warning state may subsequently be set.

This principle is illustrated in FIG. 2. The visual representation 202 comprises visual indications constituted by several black filled circles which indicate a "normal" operating condition of the corresponding process components. By a "normal" operating condition it is meant an operational state being within one of a predefined set of nominal operating states. The region of the visual representation 202 within the dashed circle 205 in FIG. 2 is shown in a close-up view. The circles 204a, 204b having a striped fill pattern indicate an emergency state for the corresponding process components, with the assessed severity of the emergency state being higher for the process component corresponding to circle 204a than for the process component corresponding to the circle 204b, which is displayed in a smaller size than the circle 204a.

The circle 204c has a white fill color, which for example may indicate an alarm state for the corresponding process component.

The circle 204d has a black fill color, which for example may indicate an operational state being within one of a predefined set of nominal operating states for the corresponding process component.

Assessment of the severity level of the emergency, alarm and/or warning state may for example comprise comparing the indicated emergency, alarm and/or warning state with a predefined mapping between a plurality of emergency, alarm and/or warning states and corresponding severity levels.

Setting a characteristic of the visual indication corresponding to the component being associated with the at least one signal indicating an emergency, alarm and/or warning state may comprise setting the characteristic such that the visual indication visually contrasts from a visual indication of a component associated with a signal indicating an operational state within one of a predefined set of nominal operating states. This is indicated in FIG. 2 by the visual contrast provided between circles 204a, 204b and 204c, having fill pattern and fill color that visually contrasts from the circle 204d having a black fill color. Such an arrangement may facilitate detection of operational status of the process components by the user when visually inspecting the visual representation 202.

Figure 3:
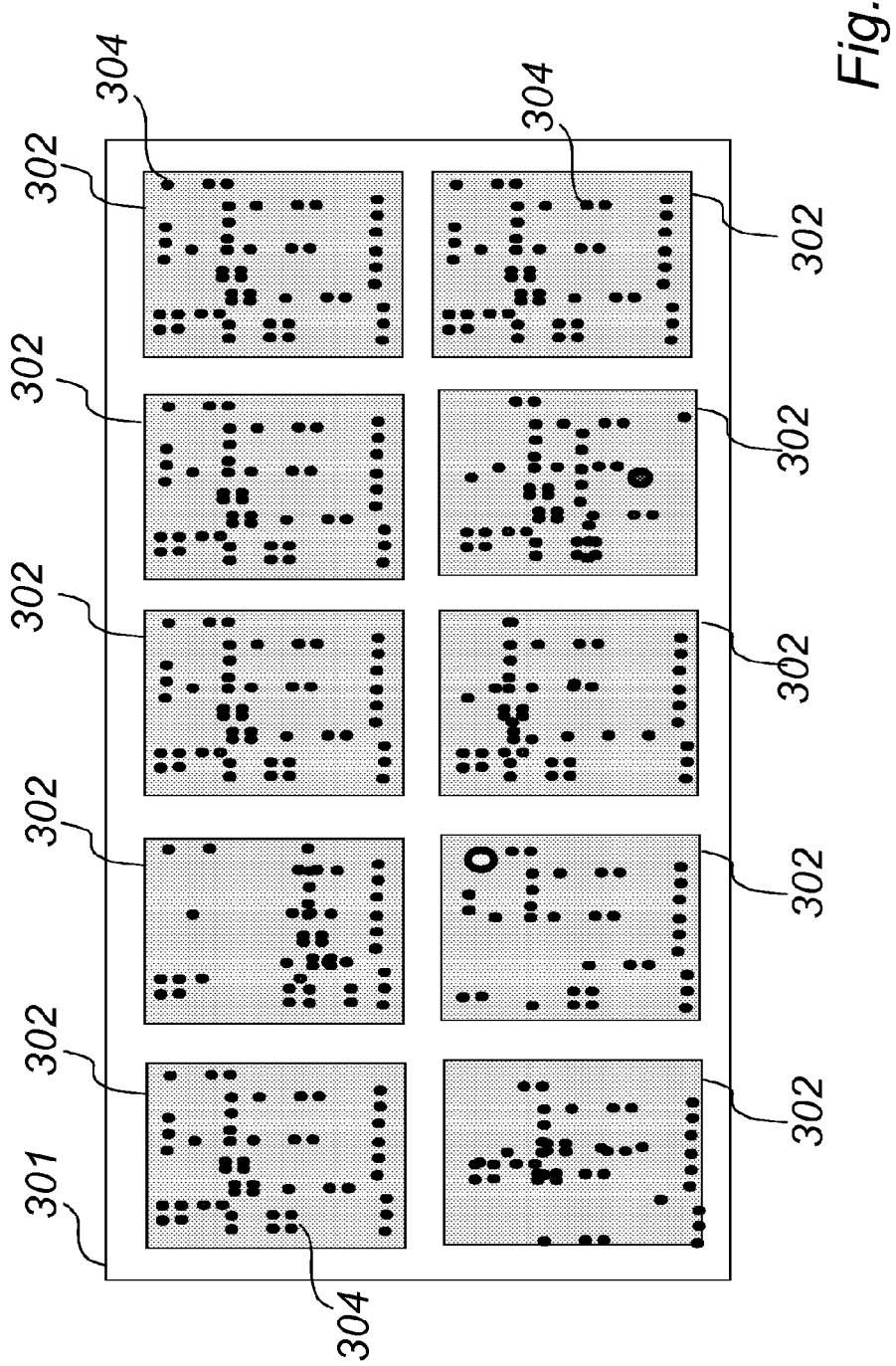
FIG. 3 is an example in accordance with the present invention for illustrating how the present invention may facilitate navigation between different UIs in a process control system comprising a plurality of UIs.

Referring now to FIG. 3, there is shown an example in accordance with the present invention for illustrating how the present invention may facilitate navigation between different UIs in a process control system comprising a plurality of UIs. FIG. 3 shows a portion 301 of an electronic visual display unit (not shown in FIG. 3) comprising visual representations 302 according to exemplifying embodiments of the present invention. Each visual representation 302 is a visual representation of a corresponding one of the plurality of UIs of the process control system (not shown in FIG. 3). Each visual representation 302 comprises a plurality of visual indications 304 (of which only some are indicated by reference numerals in FIG. 3) representing operational state of corresponding process components in the corresponding one of the plurality of UIs, each of which plurality of visual indications has been generated on basis of at least one signal associated with the corresponding process component, such as described above with reference to FIGS. 1 and/or 2.

The visual representation 304 corresponding to each of the plurality of UIs of the process control system is configured to enable a user to select the respective UI by means of user input provided to the visual representation 304, for enabling control and/or monitoring of the operational state of the components visually indicated by that UI by means of user input provided thereto.

User input to the UI may be effectuated by any suitable means, including but not limited to a pointing device such as a computer mouse for manipulating objects in the UI, a keyboard where different key presses define different operations performed on objects in the UI, etc.

Hence, the portion 301 may act as a "navigation region" on the electronic visual display unit, which navigation region allows a user to select the appropriate/desired UI and/or provides the user with an overview of the operational status of the process controlled by the process control system.

Figure 4A:
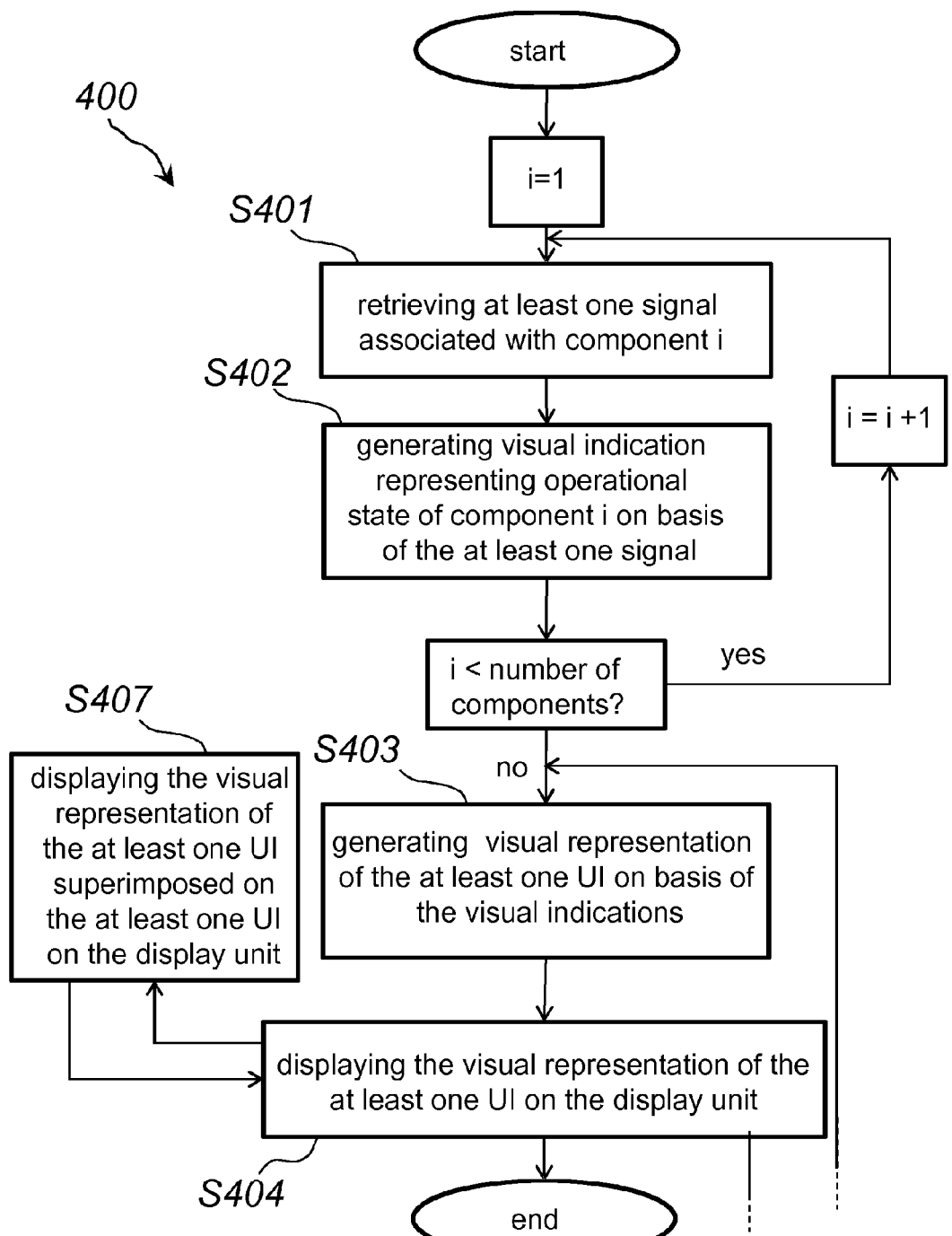

Referring now to FIGS. 4a and 4b, there is shown a flowchart of a method 400 according to an exemplifying embodiment of the present invention.

The method 400 is for displaying visual representation of at least one UI of a process control system, wherein the at least one UI is displayed on an electronic visual display unit connectable to the process control system and is adapted to visually indicate relationship between N components included in at least a part of a process controlled by the process control system. N is a positive integer. Each component of the N components is associated with at least one signal indicating an operational state of the component.

Starting at i=1, for component i the at least one signal associated with the respective component is retrieved, S401.

A visual indication representing the operational state of component i is generated on basis of the at least one signal associated with the component i, S402, wherein at least one characteristic of the visual indication depends on the at least one signal associated with component i.

After steps S401 and S402 have been performed for all N components, the visual representation of the at least one UI is generated on basis of the generated visual indications, S403.

The visual representation of the at least one UI is displayed on the display unit, S404, such that the relationship between the visual indications in the visual representation of the at least one UI as displayed on the display unit corresponds to the relationship between the plurality of components included in the at least a part of the process visually indicated by the at least one UI as displayed on the display unit.

Optionally, the method 400 may further comprise sensing a change in at least one signal of the at least one signal associated with each of the plurality of components, S405.

For each component being associated with a signal in which a change has been detected, the visual indication representing the operational state of the component may be re-generated, S406, on basis of the signal which has been changed.

The steps S405 and S406 may be performed in an automated manner by means of monitoring the at least one signal associated with each of the plurality of components.

After termination of step S406 the method 400 may return to step S403.

Hence, steps S405 and S406 may enable automatic updating of the visual representation for taking into account changes in the operational state of a component of the process, detected by sensing a change in the at least one signal corresponding to the component.

Optionally, the step S404 may comprise displaying the visual representation of the at least one UI superimposed on the at least one UI on the display unit, S407.

Referring now to FIG. 4c, there is shown a flowchart of step S402 described with reference to FIG. 4a. The at least one signal may indicate an emergency, alarm and/or warning state of the respective component.

The step S402 may optionally comprise assessing, S408, the severity level of the emergency, alarm and/or warning state on basis of the at least one signal indicating an emergency, alarm and/or warning state.

On basis of the assessment, setting, S409, a characteristic of the visual indication corresponding to the component being associated with the at least one signal indicating an emergency, alarm and/or warning state.

Figure 5:
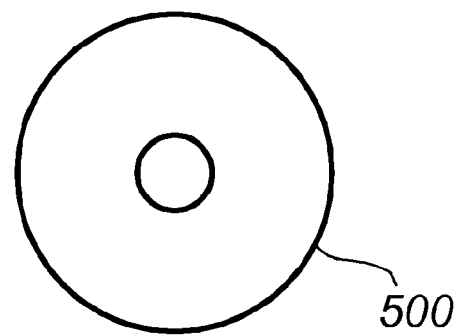
FIG. 5 is a schematic view of a computer-readable storage medium according to an exemplifying embodiment of the present invention.

Referring now to FIG. 5, there is shown a schematic view of a computer-readable storage medium 500 according to an exemplifying embodiment of the present invention, the storage medium 500 comprising a Digital Versatile Disc (DVD). On the computer-readable storage medium there is stored a computer program product adapted to, when executed in a processor unit, e.g. a general purpose processor in a computer, perform a method according to the present invention.

Although only one type of computer-readable storage medium has been described above with reference to FIG. 5, the present invention encompasses embodiments employing any other suitable type of computer-readable storage medium, such as, but not limited to, a non-volatile memory, a hard disk drive, a CD, a floppy disk, a flash memory, magnetic tape, a USB stick, a Zip drive, etc.

In conclusion, there is disclosed a method for displaying visual representation of at least one UI of a process control system, the at least one UI being displayed on an electronic visual display unit connectable to the process control system and being adapted to visually indicate relationship between a plurality of components included in at least a part of a process controlled by the process control system. Data associated with different components in the process controlled by the process control system indicative of the operational status of the respective component is used to visualize the operational status of the components in each UI on the electronic visual display unit.

While the invention has been illustrated and described in detail in the appended drawings and the foregoing description, such illustration and description are to be considered illustrative or exemplifying and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

What is claimed is:

1. A method for displaying visual representations of a plurality of user interfaces, UIs, of a process control system, the plurality of UIs being displayed on an electronic visual display unit connectable to the process control system and being adapted to visually indicate relationship between a plurality of components included in a process controlled by the process control system, each component of the plurality of components being associated with at least one signal indicating an operational state of the component, the method comprising:

for each of the plurality of components:
    retrieving, with a processing module, the at least one signal associated with the respective component; and
    generating, with the processing module, a visual indication representing the operational state of the component on basis of the at least one signal associated with the respective component, wherein at least one characteristic of the visual indication depends on the at least one signal associated with the respective component;

generating, with the processing module, the visual representation of each of the plurality of UIs on basis of the visual indications; and displaying the visual representation of each of the plurality of UIs on the display unit such that the relationship between the visual indications in the visual representation of each of the plurality of UIs as displayed on the display unit corresponds to the relationship between the plurality of components included in the process visually indicated by a corresponding UI as displayed on the display unit, wherein the visual representation of each UI is performed in such a way that the relative arrangement of the visual indications in the corresponding visual representation as displayed on the display unit corresponds to the relative arrangement of the components in the UI as displayed on the display unit.

2. The method according to claim 1, wherein the visual representation corresponding to each of the plurality of UIs is configured to enable a user to select the respective UI by means of user input provided to the visual representation for enabling control and/or monitoring of the operational state of the components visually indicated by said UI by means of user input provided to the UI.

3. The method according to claim 1, wherein the process control system is configured to control and/or monitor a process in an industrial installation and/or in an installation for production, transmission and/or distribution of energy.

4. The method according to claim 1, wherein the at least one signal comprises data measured at the respective component indicative of an operational state thereof.

5. The method according to claim 1, wherein the at least one UI is adapted to visually indicate positional and/or operational relationship between the plurality of components included in the process, wherein the positional and/or operational relationship between the visual indications in the visual representation of the at least one UI as displayed on the display unit corresponds to the positional and/or operational relationship between the plurality of components included in the at least a part of the process visually indicated in the at least one UI as displayed on the display unit.

6. The method according to claim 1, wherein the at least one characteristic comprises size, shape, pattern, brightness and/or color of the respective visual indication in the visual representation.

7. The method according to claim 1, further comprising:
sensing a change in at least one signal of the at least one signal associated with each of the plurality of components; and
for each component being associated with a signal in which a change has been detected, re-generating the visual indication representing the operational state of the component on basis of said signal which has been changed.

8. The method according to claim 7, wherein the sensing and/or re-generation is performed in an automated manner by means of monitoring the at least one signal associated with each of the plurality of components.

9. The method according to claim 1, wherein at least one signal indicates an emergency, alarm and/or warning state of the respective component, the method further comprising:
assessing the severity level of the emergency, alarm and/or warning state on basis of the at least one signal indicating an emergency, alarm and/or warning state; and
on basis of the assessment, setting a characteristic of the visual indication corresponding to the component being associated with the at least one signal indicating an emergency, alarm and/or warning state.

10. The method according to claim 9, wherein setting the characteristic of the visual indication corresponding to the component being associated with the at least one signal indicating an emergency, alarm and/or warning state comprises setting the size of the visual indication on basis of the assessed severity level.

11. The method according to claim 9, wherein the assessment of the severity level of the emergency, alarm and/or warning state comprises comparing the indicated emergency, alarm and/or warning state with a predefined mapping between a plurality of emergency, alarm and/or warning states and corresponding severity levels.

12. The method according to claim 9, wherein setting a characteristic of the visual indication corresponding to the component being associated with the at least one signal indicating an emergency, alarm and/or warning state comprises setting the characteristic such that the visual indication visually contrasts from a visual indication of a component being associated with a signal indicating an operational state being within one of a predefined set of nominal operating states.

13. The method according to claim 9, wherein setting a characteristic of the visual indication corresponding to the component being associated with the at least one signal indicating an emergency, alarm and/or warning state comprises setting the characteristic in accordance with Abnormal Situation Management, ASM, guidelines.

14. The method according to claim 9, wherein setting a characteristic of the visual indication corresponding to the component being associated with the at least one signal indicating an emergency, alarm and/or warning state comprises:
setting the color of the visual indication to a first color on a condition that the at least one signal of the corresponding component indicates an emergency state;
setting the color of the visual indication to a second color on a condition that the at least one signal of the corresponding component indicates an alarm state;
setting the color of the visual indication to a third color on a condition that the at least one signal of the corresponding component indicates a warning state;
wherein the first color, the second color and the third color are different from a color of a visual indication being associated with a signal indicating an operational state being within one of a predefined set of nominal operating states.

15. The method according to claim 9, further comprising varying the characteristic of the visual indication corresponding to the component being associated with the at least one signal indicating an emergency, alarm and/or warning state in the visual representation according to a predetermined temporal function.

16. The method according to claim 1, further comprising:
displaying the visual representation of the at least one UI superimposed on the at least one UI on the display unit.

17. A processing device connectable to a process control system comprising a plurality of interfaces, UIs, adapted to visually indicate relationship between a plurality of components included in a process controlled by the process control system, each component of the plurality of components being associated with at least one signal indicating an operational state of the component; the processing device comprising:
an electronic visual display unit configured to display the plurality of UIs; and
a processing module;
the processing module being adapted to, for each of the plurality of components:
retrieve the at least one signal associated with the respective component; and
generate a visual indication representing the operational state of the component on basis of the at least one signal associated with the respective component, wherein at least one characteristic of the visual indication depends on the at least one signal associated with the respective component;

the processing module being further adapted to:

generate a visual representation of each of the plurality of UIs on basis of the visual indications; and display the visual representation of each of the plurality of UIs on the display unit such that the relationship between the visual indications in the visual representation of each of the plurality of UIs as displayed on the display unit corresponds to the relationship between the plurality of components included in the process visually indicated by a corresponding UI as displayed on the display unit, wherein the visual representation of each UI is performed in such a way that the relative arrangement of the visual indications in the corresponding visual representation as displayed on the display unit corresponds to the relative arrangement of the components in the UI as displayed on the display unit.

18. A process control system including a processing device according to claim 17.

19. A computer program product adapted to, when executed in a processor unit, perform a method for displaying visual representations of a plurality of user interfaces, UIs, of a process control system, the plurality of UIs being displayed on an electronic visual display unit connectable to the process control system and being adapted to visually indicate relationship between a plurality of components included in a process controlled by the process control system, each component of the plurality of components being associated with at least one signal indicating an operational state of the component, the method comprising:

for each of the plurality of components:

retrieving the at least one signal associated with the respective component; and generating a visual indication representing the operational state of the component on basis of the at least one signal associated with the respective component, wherein at least one characteristic of the visual indication depends on the at least one signal associated with the respective component;

generating the visual representation of each of the plurality of UIs on basis of the visual indications; and displaying the visual representation of each of the plurality of UIs on the display unit such that the relationship between the visual indications in the visual representation of each of the plurality of UIs as displayed on the display unit corresponds to the relationship between the plurality of components included in the process visually indicated by a corresponding UI as displayed on the display unit, wherein the visual representation of each UI is performed in such a way that the relative arrangement of the visual indications in the corresponding visual representation as displayed on the display unit corresponds to the relative arrangement of the components in the UI as displayed on the display unit.

20. A non-transitory computer-readable storage medium on which there is stored a computer program product adapted to, when executed in a processor unit, perform a method for displaying visual representations of a plurality of user interfaces, UIs, of a process control system, the plurality of UIs being displayed on an electronic visual display unit connectable to the process control system and being adapted to visually indicate relationship between a plurality of components included in a process controlled by the process control system, each component of the plurality of components being associated with at least one signal indicating an operational state of the component, the method comprising:

for each of the plurality of components:

retrieving the at least one signal associated with the respective component; and generating a visual indication representing the operational state of the component on basis of the at least one signal associated with the respective component, wherein at least one characteristic of the visual indication depends on the at least one signal associated with the respective component;

generating the visual representation of each of the plurality of UIs on basis of the visual indications; and displaying the visual representation of each of the plurality of UIs on the display unit such that the relationship between the visual indications in the visual representation of each of the plurality of UIs as displayed on the display unit corresponds to the relationship between the plurality of components included in the process visually indicated by a corresponding UI as displayed on the display unit, wherein the visual representation of each UI is performed in such a way that the relative arrangement of the visual indications in the corresponding visual representation as displayed on the display unit corresponds to the relative arrangement of the components in the UI as displayed on the display unit.

21. Use of a processing device in a process control system for controlling and/or monitoring of a process in an industrial installation and/or in an installation for production, transmission and/or distribution of energy, the process control system comprising a plurality of interfaces, UIs, adapted to visually indicate relationship between a plurality of components included in a process controlled by the process control system, each component of the plurality of components being associated with at least one signal indicating an operational state of the component; the processing device comprising:

an electronic visual display unit configured to display the plurality of UIs; and a processing module;

the processing module being adapted to, for each of the plurality of components:

retrieve the at least one signal associated with the respective component; and generate a visual indication representing the operational state of the component on basis of the at least one signal associated with the respective component, wherein at least one characteristic of the visual indication depends on the at least one signal associated with the respective component;

the processing module being further adapted to:

generate a visual representation of each of the plurality of UIs on basis of the visual indications; and display the visual representation of each of the plurality of UIs on the display unit such that the relationship between the visual indications in the visual representation of each of the plurality of UIs as displayed on the display unit corresponds to the relationship between the plurality of components included in the process visually indicated by a corresponding UI as displayed on the display unit, wherein the visual representation of each UI is performed in such a way that the relative arrangement of the visual indications the corresponding visual representation as displayed on the display unit corresponds to the relative arrangement of the components in the UI as displayed on the display unit.

* * * * *